(12) United States Patent
Foster et al.

(10) Patent No.: US 10,501,172 B2
(45) Date of Patent: Dec. 10, 2019

(54) AIRCRAFT LANDING GEAR ASSEMBLY

(71) Applicant: Safran Landing Systems UK Limited, Gloucester (GB)

(72) Inventors: Nicholas Foster, Gloucester (GB); Sam Evans, Gloucester (GB)

(73) Assignee: Safran Landing Systems UK LTD (GB)

( * ) Notice: Subject to any disclaimer, the term of this patent is extended or adjusted under 35 U.S.C. 154(b) by 288 days.

(21) Appl. No.: 15/477,770

(22) Filed: Apr. 3, 2017

(65) Prior Publication Data

US 2017/0291695 A1    Oct. 12, 2017

(30) Foreign Application Priority Data

Apr. 6, 2016   (EP) ..................................... 16164068

(51) Int. Cl.
| | |
|---|---|
| *B64C 25/10* | (2006.01) |
| *B65G 23/04* | (2006.01) |
| *B65G 39/06* | (2006.01) |
| *E21B 19/22* | (2006.01) |
| *F16C 13/00* | (2006.01) |
| *F16C 33/20* | (2006.01) |

(52) U.S. Cl.
CPC .............. *B64C 25/10* (2013.01); *B65G 23/04* (2013.01); *B65G 39/06* (2013.01); *E21B 19/22* (2013.01); *F16C 13/006* (2013.01); *F16C 33/203* (2013.01)

(58) Field of Classification Search
CPC ......... B64C 25/10; B64C 25/36; B64C 25/34; E21B 19/22; F16C 33/203; F16C 33/208; F16C 13/006; F16C 33/205; F16C 2208/02; F16C 2326/43; B65G 23/04; B65G 39/06

See application file for complete search history.

(56) References Cited

U.S. PATENT DOCUMENTS

| | | | | |
|---|---|---|---|---|
| 4,609,315 A | * | 9/1986 | Briles ................. | F16B 19/1045 403/408.1 |
| 4,765,787 A | * | 8/1988 | Briles ................. | F16B 19/1054 411/41 |
| 5,868,356 A | * | 2/1999 | Giedris .................... | B21J 15/02 244/132 |

(Continued)

FOREIGN PATENT DOCUMENTS

| | | |
|---|---|---|
| EP | 1288512 A2 | 3/2003 |
| GB | 2452939 A | 3/2009 |

(Continued)

OTHER PUBLICATIONS

European Search Report for European Application No. 16164068. 5-1754, dated Sep. 12, 2016, 8 Pages.

*Primary Examiner* — Assres H Woldemaryam

(74) *Attorney, Agent, or Firm* — RatnerPrestia

(57) ABSTRACT

An aircraft landing gear assembly including structural members coupled via a coupling including a bearing. The bearing has a body defining a first bearing surface arranged to contact a first counter-face of the coupling. The first bearing surface is defined by a first tubular layer of fibre reinforced polymer of a first type having an axis and containing synthetic fibres of a first type wound around and along the axis of the bearing. The bearing body further has a second tubular layer of fibre reinforced polymer of a second type containing synthetic fibres of a second type wound around and along the axis of the bearing.

19 Claims, 3 Drawing Sheets

(56) References Cited

U.S. PATENT DOCUMENTS

| | | | | |
|---|---|---|---|---|
| 2003/0095729 A1* | 5/2003 | Post | .................. | F16C 23/045 |
| | | | | 384/213 |
| 2011/0058760 A1* | 3/2011 | Magnus | ................ | B65G 23/04 |
| | | | | 384/280 |
| 2011/0262059 A1* | 10/2011 | Karaki | ................ | F16C 33/201 |
| | | | | 384/13 |
| 2015/0354614 A1* | 12/2015 | Green | .................. | F16C 11/02 |
| | | | | 24/711.5 |
| 2016/0084307 A1* | 3/2016 | Bennett | ............... | B64C 25/001 |
| | | | | 384/115 |
| 2016/0375979 A1* | 12/2016 | Von-Wilmowsky | ...... | B64C 1/00 |
| | | | | 244/17.17 |

FOREIGN PATENT DOCUMENTS

| | | | | |
|---|---|---|---|---|
| WO | 2013011324 A1 | 1/2013 | | |
| WO | WO-2013011324 A1 * | 1/2013 | ............ | F16C 11/045 |

\* cited by examiner

AIRCRAFT LANDING GEAR ASSEMBLY

This application claims the benefit of and priority to European Application EP 16164068.5, filed on Apr. 6, 2016, the contents of which are incorporated herein by reference.

BACKGROUND OF THE INVENTION

An aircraft landing gear assembly can include structural members coupled via a coupling or joint which includes one or more bearings. For example, members can be movably coupled via a pin joint. A pin joint will generally include a plurality of bearings, each being located between the pin and one of the structural members.

Aircraft landing gear assembly joints can be designed to withstand static pressure in excess of 400 MPa. Static pressure results from first and second structural members acting on the joint while the aircraft is on the ground; for example, the lugs of side stay links acting on a common pin joint during aircraft taxiing, where the pin joint is subjected to multi-directional loading.

Aircraft landing gear assembly joints can also be designed to withstand dynamic pressure of around 150 MPa due to relative movement between the structural members; for example, during articulation of the landing gear between deployed and stowed conditions.

It is common for aircraft landing gear assembly joints to be periodically greased in order to maintain a low friction coefficient at the bearing surface to control the amount of wear, and to flush out contaminants. Integral grease channels can be provided within one or more of the structural members to enable grease to be introduced to the bearing surface during maintenance operations.

However, the present inventors have identified that grease channels can lead to increased joint complexity. Grease channels can also result in stress raisers, defining regions of weakness in the pin joint. Moreover, a maintenance engineer could overlook a joint during maintenance, resulting in increased friction and wear. It is also possible that different types of grease could be introduced into a joint, resulting in loss of lubrication performance. Grease can also be displaced under sustained load, leading to areas starved of lubricant.

The present inventors have also identified that the mass of known landing gear assemblies can be reduced.

SUMMARY OF THE INVENTION

In accordance with a first aspect of the present invention there is provided an aircraft landing gear assembly comprising a first structural member coupled to a second structural member via a mechanical coupling, the mechanical coupling comprising a bearing, the bearing comprising a tubular body defining a first bearing surface arranged to contact a first counter-face of the coupling, the first bearing surface being defined by a first tubular layer of fibre reinforced polymer of a first type having an axis and containing synthetic fibres of a first type wound around and along the axis of the bearing, the bearing body further comprising a second tubular layer of fibre reinforced polymer of a second type containing synthetic fibres of a second type wound around and along the axis of the bearing, wherein one of the first and second fibre reinforced polymers has greater compressive strength characteristics than the other and/or wherein one of the first and second fibre reinforced polymers has greater self-lubrication characteristics than the other. The arrangement can be such that the fibre reinforced polymer with the greatest compressive strength characteristics has the lowest self-lubrication characteristics relative to the other.

Although the use of polymers for self-lubricating bearings is known, polymer bearings known to the inventors are in the form of a sintered liner material with lubrication provided through the use of a thin layer, such as less than 1 mm, of PTFE. Such bearings are designed to be used in low loaded joints arranged to withstand static pressure of around 120 MPa, and with limited rotation. These known bearings are therefore not suitable for use in aircraft landing gear assemblies, in which bearings can experience static pressures in excess of 400 MPa in view of shock loads. The present inventors surprisingly found that polymer bearings as described herein can withstand static pressure in excess of 600 MPa and in some cases in excess of 750 MPa when used as a tubular bearing in a landing gear assembly. Landing gear assemblies according to embodiments of the invention can lead to significant weight reduction in comparison to known landing gear assemblies. The self-lubricating properties of the first bearing layer also enable the omission of grease channels. The inventors have also found that composite filament wound layer bearings as described herein are surprisingly resistant to the working environment within a landing gear coupling joint. The bearings are suitably ductile to flex with the structural members which can reduce internal stresses within the coupling in comparison to at least some known bearings. The bearings also have good misalignment resistance and a high fracture resistance in comparison to at least some known bearings.

The polymer of the second type can have greater a compressive strength characteristic than the polymer of the first type and/or the polymer of the first type can have a greater self-lubrication characteristic than the polymer of the second type. This arrangement can be particularly useful for aircraft landing gear pin joints in which the bearing takes the form of a bush that is statically fitted into a lug hole and arranged to dynamically carry a conventional pivot pin within the bore of the bearing.

The polymer of the first type can comprise an epoxy, a resin or a thermoset material, and can contain dry lubricant particles which are revealed as the bearing wears. The synthetic fibres of the first type can comprise continuous fibres such as carbon, aramid, glass, PTFE, polyester, or a combination of them.

The polymer of the second type can comprise an epoxy, a resin or a thermoset material. It is preferred that the polymers of the first and second types match for consolidation purposes. The synthetic fibres of the first type can comprise continuous fibres such as carbon, aramid, glass, PTFE, polyester, or a combination of them.

Preferably the relatively self-lubricating layer of the bearing comprises epoxy containing particles of dry lubricant, such as graphite, and a continuously woven mix of PTFE fibres and carbon fibres. Preferably the relatively high strength layer comprises epoxy containing glass fibres. This combination was found to be particularly effective at handling static pressures exceeding 600 MPa and providing self-lubrication to the landing gear coupling or joint.

The bearing body can define a second bearing surface arranged to contact a second counter-face of the coupling, the body separating the first bearing surface from the second bearing surface such that a thickness of the tubular bearing body is defined between the first and second bearing surfaces, wherein the thickness of the first layer is less than ¼ of the total thickness of the tubular bearing body.

The bearing body can comprise a third tubular layer of fibre reinforced polymer of a third type containing synthetic fibres of a third type wound around the second tube. The polymer of the second type can have greater compressive strength characteristics than the polymer of the third type and the polymer of the third type can have greater self-lubrication characteristics than the polymer of the second type. The third type in both cases can be the same as the first type.

The first tube can be solid so as to define a solid pin-like bearing. In such embodiments, the inner tube can be formed from the relatively strong fibre-reinforced polymer and the outer tube can be formed from the relatively self-lubricating fibre-reinforced polymer.

The coupling can be arranged to movably couple the first structural member to the second structural member such that the first counter-face of the coupling moves relative to the first bearing surface.

The first bearing surface and the first counter-face can each be circular in cross section such that the coupling is arranged to permit rotation of the first structural member relative to the second structural member about the axis of the bearing.

The coupling can comprise a pin mounted within holes formed through the first and second structural members so as to define a pin joint, the bearing being provided between the pin on the one hand and one or more of the first and second parts on the other hand, the pin defining the first counter-face of the coupling.

The bearing can include a radial flange at one end, the radial flange comprising a radially extending layer of fibre reinforced polymer having an axis and containing synthetic fibres wound radially around the axis of the bearing.

The landing gear assembly can comprise a plurality of bearings as defined above, each bearing having a respective bearing surface arranged in contact with a respective counter-face of the coupling.

According to a second aspect of the present invention, there is provided an aircraft including one or more aircraft landing gear assemblies according to the first aspect.

According to a third aspect of the present invention, there is provided a method of forming a bearing for use in an aircraft landing gear assembly, the method comprising:
  forming a first tubular layer of fibre reinforced polymer of a first type having an axis and containing synthetic fibres of a first type wound around and along the axis of the bearing;
  forming a second tubular layer of fibre reinforced polymer of a second type containing synthetic fibres of a second type wound around and along the outer surface of the first tubular layer; and
  curing the first and second layers to form a consolidated tubular body.

Optional features of the first aspect apply to the method of the third aspect in an analogous manner; for example, one of the first and second fibre reinforced polymers can have greater compressive strength characteristics than the other and/or one of the first and second fibre reinforced polymers can have greater self-lubrication characteristics than the other.

The tubular layers of fibre reinforced polymer can each be formed in a conventional manner; for example, a filament winding process in which strands of fibres pre-impregnated with uncured polymer are wound around a tool, such as a mandrel, or pre-wound inner layer of fibre reinforced polymer.

The method can comprise:
  forming a radial flange on the bearing by machining away a portion of the second tubular layer to leave a radial flange; and
  optionally bonding a layer of self-lubricating material to an axial face of the flange.

The method can comprise forming a radial flange which is larger in cross section than the tubular body and bonding the radial flange to an axial end face of the tubular body.

According to a fourth aspect of the present invention, there is provided a method of forming or maintaining an aircraft landing gear assembly comprising a first structural member coupled to a second structural member via a mechanical coupling, the mechanical coupling comprising a bearing, the bearing defining a first bearing surface arranged to contact a first counter-face of the coupling, the method comprising:
  optionally removing a worn bearing from the mechanical coupling; and
  fitting a bearing to the coupling, the bearing defining a first bearing surface arranged to contact the first counter-face of the coupling, the first bearing surface being defined by a first tubular layer of fibre reinforced polymer of a first type having an axis and containing synthetic fibres of a first type wound around and along the axis of the bearing, the bearing further comprising a second tubular layer of fibre reinforced polymer of a second type containing synthetic fibres of a second type wound around and along the axis of the bearing, wherein the one of the first and second fibre reinforced polymers has greater compressive strength characteristics than the other and/or wherein the one of the first and second fibre reinforced polymers has greater self-lubrication characteristics than the other.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
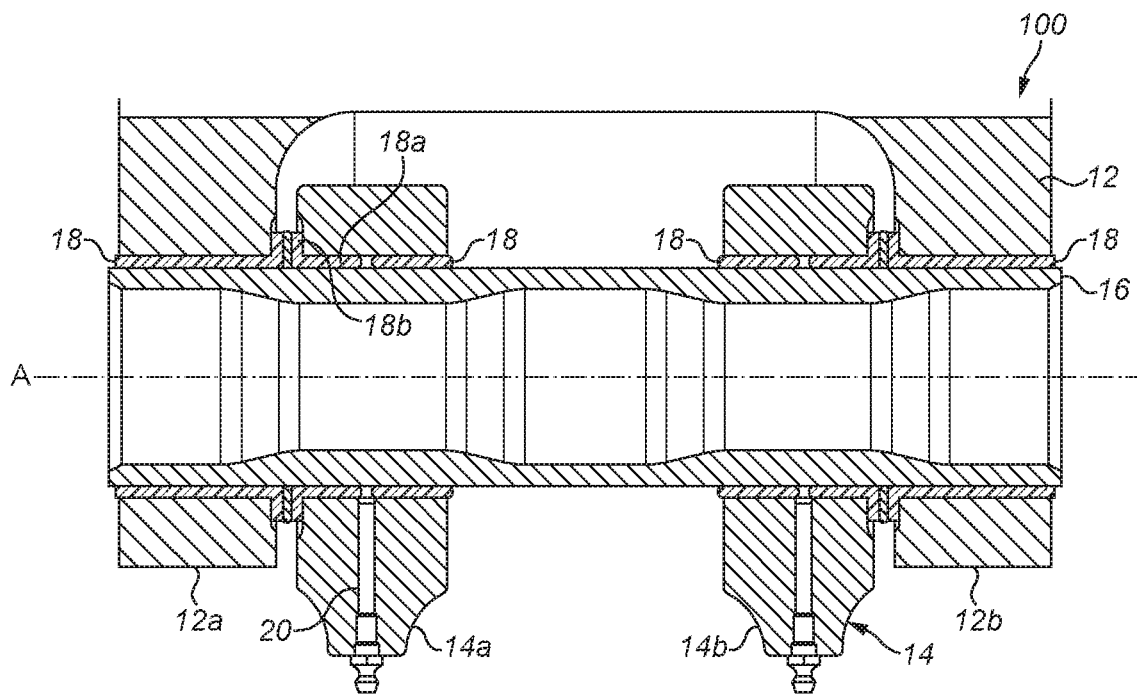
FIG. 1 is a partial view in cross section of a prior art landing gear assembly.

FIG. 1 shows part of a conventional landing gear assembly 100 in which a first structural member 12 is pivotally coupled to a second structural member 14 via a pin joint. The first structural member 12 terminates in a lug having a pair of arms 12a, 12b which define a space between them that is sized to receive first and second arms 14a, 14b of a lug defined at the end of the second structural member 14. Each arm 12a, 12b, 14a, 14b includes a hole such that when the lugs are aligned, a pin 16 can be received by each hole in order to pivotally couple the first structural member 12 to the second structural member 14. The first and second structural members 12, 14 can for example be main fitting attachment lugs, by which the main fitting is pivotally coupled to the airframe, links of a side stay, torque links, lock links, shortening links, bogie pivot pin, actuator attachments or the like.

Each lug hole is provided with a plain bearing 18 having a body 18a which extends generally parallel with respect to the longitudinal axis A of the pin 16 so as to be situated between the lug and pin 16 to support the pin 16 in use. The axis A can also describe the axis of the bearings 18. Thus, the body 18a of each bearing 18 defines a bearing surface which in use cooperates with a bearing counter-face of the pin 16. The length of each bearing body can be defined by the width of the lug arms 12a, 12b, 14a, 14b at the lug holes; examples of typical body 18a lengths are between 20 mm and 100 mm.

Each bearing 18 also has a radial flange 18b that reacts lateral loads, serves to limit axial travel of the bearing 18 through the lug hole and by which the bearing 18 can be attached to the lug.

The pin joint 16 is designed to withstand operational loads resulting in static pressure across each bearing body 18a of at least 300 MPa, and in some cases pressures in excess of around 400 MPa. The joint can also be designed to withstand dynamic pressure of around 150 MPa as the landing gear members move between conditions. Due to this, the bearings 18 are generally formed from aluminium bronze or stainless steel.

Grease channels 20 are provided within at least some of the structural members 14a, 14b to enable grease lubricant or the like to be introduced to the bearing surface during maintenance operations. However, the present inventors have identified that grease channels 20 can lead to increased joint complexity. Grease channels 20 can also result in stress raisers, defining regions of weakness in the pin joint. Moreover, a maintenance engineer could overlook a joint during maintenance, resulting in increased friction and wear. It is also possible that different types of grease could be introduced into a joint, resulting in loss of lubrication performance.

Figure 2:
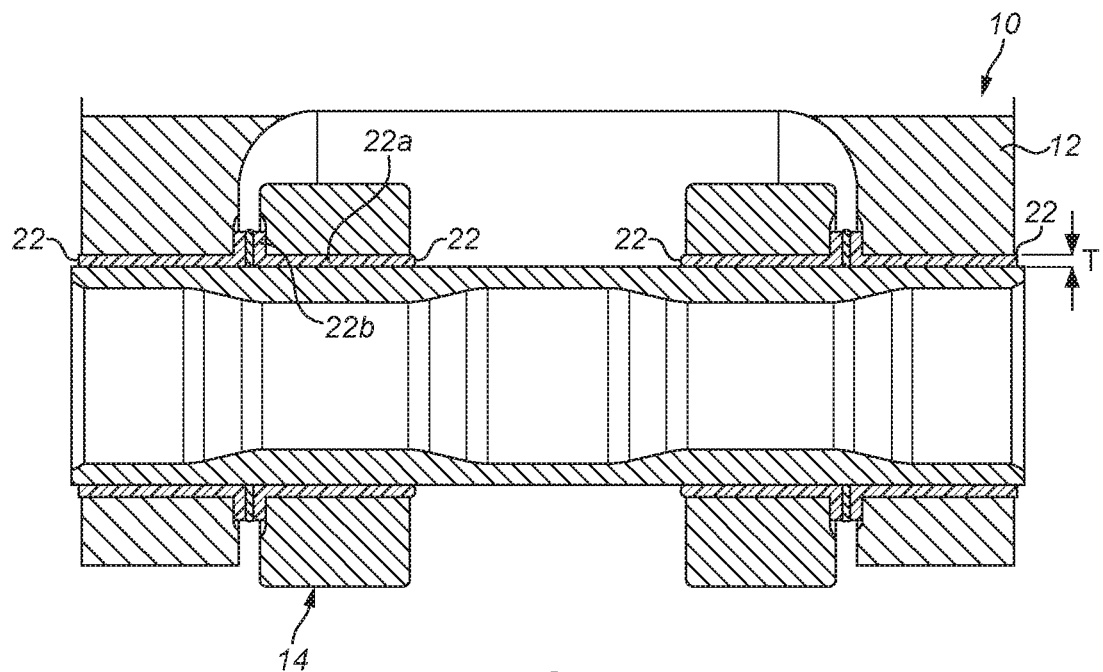
FIG. 2 is a partial view in cross section of a landing gear assembly according to an embodiment of the invention.

FIG. 2 shows part of a landing gear assembly 10 according to an embodiment of the present invention. The landing gear assembly 10 is similar to the landing gear assembly 100 of FIG. 1, where the lugs, bearings and pin together define a coupling between the structural members.

Figure 3:
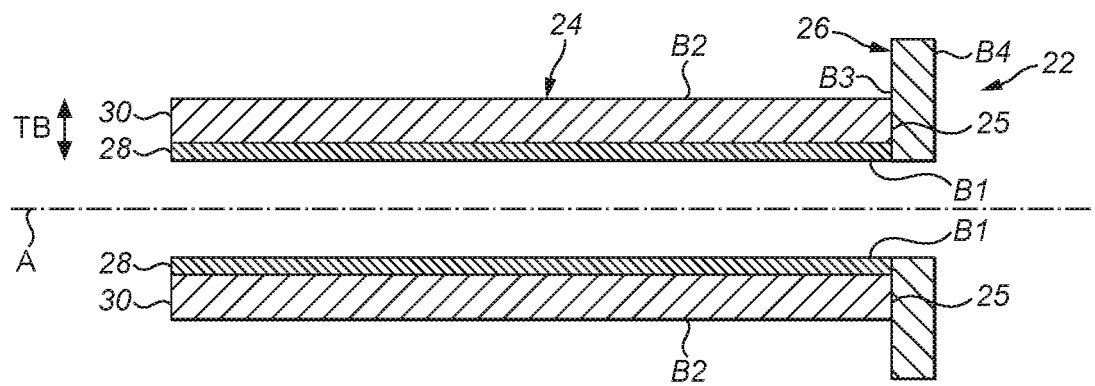
FIG. 3 is a diagram in cross section of the bearing of FIG. 2.

Referring additionally to FIG. 3, the tubular bearings 22 each have a generally cylindrical tubular body 24 and optionally a radial flange 26. In other embodiments the tubular body 24 can have a different cross-sectional profile; for example, rectangular.

The inner, bore defining face of the tubular body 24 defines a first bearing surface B1 which in use is arranged to support the pin 16 of FIG. 2. The outer cylindrical face of the tubular body 24 defines a second bearing surface B2 which in use is arranged to be statically engaged with a lug bore surface so that the bearing 22 is retained within the lug bore; for example, by way of an interference fit. The bearing surfaces B1 and B2 are parallel; however, in other embodiments the bearing can includes non-parallel sides, such as a tapered or spherical bearing. The distance between the bearing surfaces B1, B2 defines the thickness TB of the tubular body 24. The bearing thickness TB can be, for example, between 4 mm and 25 mm.

The tubular body 24 is formed from a concentric pair of fibre reinforced polymer tubes 28, 30. The inner tube 28 is formed from a tubular layer of fibre reinforced polymer of a first type having an axis A and containing synthetic fibres of a first type wound around and along the axis A of the bearing 22. The outer tube 30 is formed from tubular layer of fibre reinforced polymer of a second type containing synthetic fibres of a second type wound around the first tube 28. The polymer of the second type can have greater compressive strength characteristics than the polymer of the first type and the polymer of the first type can have greater self-lubrication properties than the polymer of the second type. The skilled person will be capable of measuring the compressive strength and lubrication properties of a given bearing by routine experimentation. The inner tube 28 can for example have a uniform thickness of between 1 and 3 mm, with the outer tube being up to, for example, 20 mm in uniform thickness.

The polymer of the first type can comprise an epoxy, a resin or a thermoset material, and can contain dry lubricant particles which are held within the polymer and which get released as the bearing wears. The synthetic fibres of the first type can comprise continuous fibres such as carbon, aramid, glass, PTFE, polyester, or a combination of them.

The polymer of the second type can comprise an epoxy, a resin or a thermoset material. It is preferred that the polymers of the first and second types match for consolidation purposes. The synthetic fibres of the first type can comprise continuous fibres such as carbon, aramid, glass, PTFE, polyester, or a combination of them.

The fibres within each layer 28, 30 can be coated with uncured polymer in a conventional manner and wound around the axis A of the bearing, for example using a mandrel, so as to extend axially along the tubular length of the bearing 22 in a helical manner. The number of axial layers disposed in this manner will determine the thickness of the bearing layer. The fibres can be woven at an angle of between 30 and 75 degrees to the longitudinal axis A and in some examples at 45 degrees. Once the two or more bearing tube layers 28, 30 have been formed, the bearing body can be cured in a conventional manner, such as heat treatment.

Preferably the relatively self-lubricating layer comprises epoxy containing particles of dry lubricant such as graphite and a continuously woven mix of PTFE fibres and carbon fibres and preferably the relatively high strength layer comprises epoxy containing glass fibres, as this combination was found to be particularly effective at handling static pressures exceeding 600 MPa and providing self-lubrication to the joint.

In one specific example, the fibre reinforced polymer material of the body 24 can be a material such as GAR-MAX®, preferably High Strength GAR-MAX® produced by GGB Bearing Technology. Alternatively, Fibre-Lube™ by Daemar Inc. can be used.

Figures 4A, 4B:
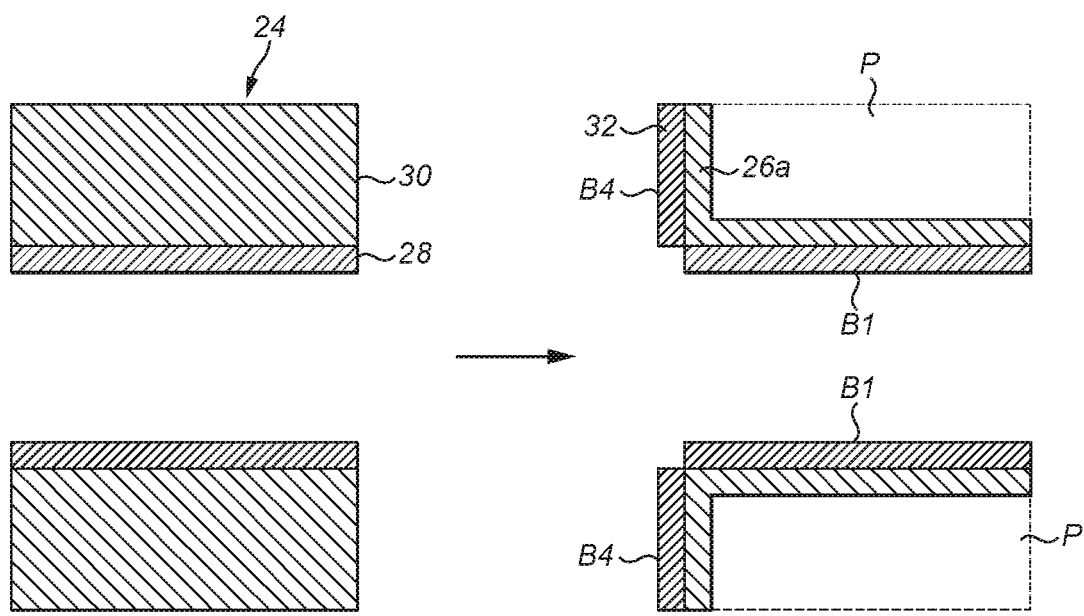
FIGS. 4a and 4b are diagrams in cross section of a method of assembling a landing gear assembly bearing according to another embodiment of the invention.
Figure 5A:
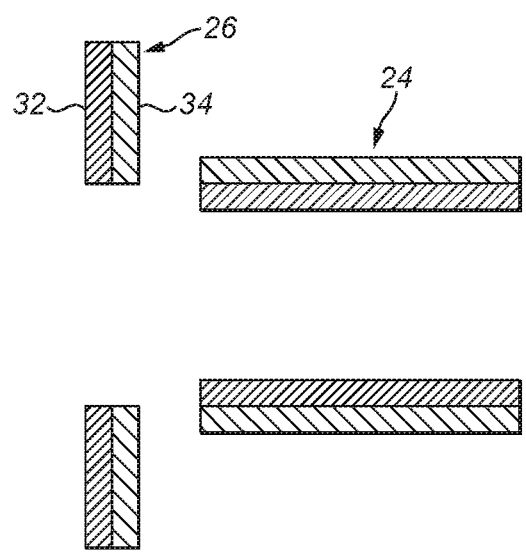
FIGS. 5a and 5b are diagrams in cross section of a method of assembling according to another embodiment of the invention.
Figure 5B:
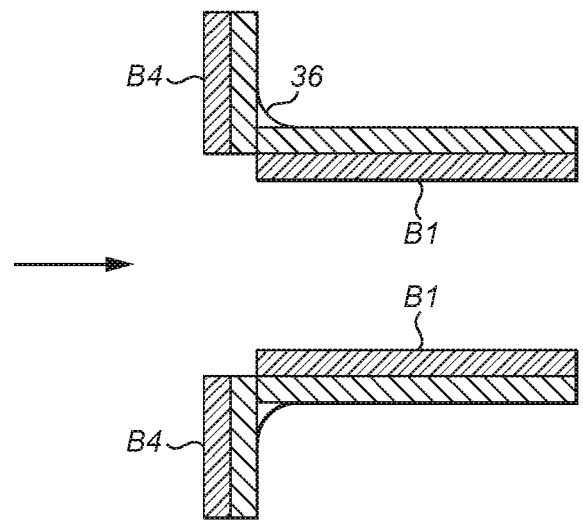

The optional radial flange 26 has a first axial surface that defines a third bearing surface B3, and a second axial surface that defines a fourth bearing surface B4. The bearing surfaces B3 and B4 are parallel in this example, but this need not be the case. As illustrated in FIGS. 4a and 4b, the flange 26 can be formed by machining a cylindrical portion P of the second layer 30 once it has been wound around and cured on the first layer 28, so as to leave a radially extending flange 26a. An axial layer 32 of self-lubricating material such as PTFE bearing tape can be applied to the outer face of the flange 26a to define the fourth bearing surface B4. Alternatively, as shown in FIGS. 5a and 5b, the flange 26 can be formed as a separate piece 34 of any suitable material that can be formed in the shape of a washer and chemically bonded to the body 24 at 36 to form the bearing. Again, the flange piece 34 can be provided with an axial layer 32 of self-lubricating material to define the fourth bearing surface B4. In all embodiments, the flange can be arranged such that a space or chamfer is created where the bearing surfaces B1 and B4 would otherwise meet in order to prevent direct contact between the second layer 30 and dynamic coupling counter-face(s).

Bearings according to embodiments of the invention can include a third tube (not shown) wound around the second tube to define the second bearing surface, the third tube being formed from a tubular layer of fibre reinforced polymer of a third type containing synthetic fibres of a third type wound around the second tube 30. The polymer of the second type can have greater compressive strength characteristics than the polymer of the third type and the polymer of the third type can have greater self-lubrication characteristics than the polymer of the second type. The third type in both cases can be the same as the first type. Moreover, in any embodiment, the innermost tube can be solid so as to define a pin-like bearing. In such embodiments, it is likely that the inner tube will be formed from the relatively strong fibre-reinforced polymer and the outer tube will formed from the relatively self-lubricating fibre-reinforced polymer.

As will be apparent from FIG. 2, a landing gear assembly according to embodiments of the invention can have a plurality of bearings as defined herein, each bearing having one or more respective bearing surfaces each arranged in dynamic or static contact with a respective counter-face of the coupling. Counter-faces of the coupling can be provided by surfaces of the structural elements, a pin or other coupling member, or by other bearings or bearing parts such as races of roller bearings.

Aircraft landing gear assemblies according to embodiments of the invention including self-lubricating polymer bearings as described above allow the structural members to be easier to design and analyse and can significantly reduce the weight of an aircraft landing gear assembly. The bearings can be applied to new landing gear and also retrofitted to in-service landing gear during maintenance, repair and overhaul operations.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of members or steps other than those listed in any claim or the specification as a whole. The singular reference of an element does not exclude the plural reference of such members and vice-versa. Parts of the invention may be implemented by means of hardware comprising several distinct members. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising a first structural member coupled to a second structural member via a mechanical coupling, the mechanical coupling comprising a bearing, the bearing defining a first bearing surface arranged to contact a first counter-face of the coupling, the first bearing surface being defined by a first tubular layer of fibre reinforced polymer of a first type having an axis and containing synthetic fibres of a first type wound around and along the rotation axis of the first tubular layer, the bearing further comprising a second tubular layer of fibre reinforced polymer of a second type containing synthetic fibres of a second type wound around and along the rotation axis of the first tubular layer, wherein one of the first and second fibre reinforced polymers has greater compressive loading capability than the other and the other of the first and second fibre reinforced polymers comprises dry lubricant particles.

2. The aircraft landing gear assembly according to claim 1, wherein the polymer of the first type comprises an epoxy, a resin or a thermoset material and/or the polymer of the second type comprises an epoxy, a resin or a thermoset material.

3. The aircraft landing gear assembly according to claim 1, wherein the synthetic fibres of the first type and the second type are continuous fibres.

4. The aircraft landing gear assembly according to claim 1, wherein the bearing has a second bearing surface arranged to contact a second counter-face of the coupling, the body separating the first bearing surface from the second bearing surface such that a thickness of a tubular body of the bearing is defined between the first and second bearing surfaces, wherein the thickness of the first layer is less than ¼ that of the total thickness of the bearing body.

5. The aircraft landing gear assembly according to claim 1, wherein the coupling is arranged to movably couple the first structural member to the second structural member such that the first counter-face of the coupling moves relative to the first bearing surface.

6. The aircraft landing gear assembly according to claim 5, wherein the first bearing surface and the first counter-face are each circular in cross section such that the coupling is arranged to permit rotation of the first structural member relative to the second structural member about the rotation axis of the first tubular layer.

7. The aircraft landing gear assembly according to claim 5, wherein the coupling comprises a pin mounted within holes formed through the first and second structural members so as to define a pin joint, the bearing being provided between the pin and one or more of the first and second parts, the pin defining the first counter-face of the coupling.

8. The aircraft landing gear assembly according to claim 1, wherein the bearing includes a radial flange at one end.

9. The aircraft landing gear assembly according to claim 1, wherein the bearing comprise a plurality of bearings, each bearing having a respective bearing surface arranged in contact with a respective counter-face of the coupling.

10. The aircraft landing gear assembly according to claim 1, wherein the layer containing dry lubricant particles comprises epoxy containing particles of dry lubricant and a continuously woven mix of polytetrafluoroethylene ("PTFE") fibres and carbon fibres.

11. The aircraft landing gear assembly according to claim 10, wherein the layer having greater compressive loading capability comprises epoxy containing glass fibres.

12. An aircraft including one or more aircraft landing gear assemblies, each aircraft landing gear assembly comprising a first structural member coupled to a second structural member via a mechanical coupling, the mechanical coupling comprising a bearing, the bearing defining a first bearing surface arranged to contact a first counter-face of the coupling, the first bearing surface being defined by a first tubular layer of fibre reinforced polymer of a first type having an axis and containing synthetic fibres of a first type wound around and along a rotation axis of the first tubular layer, the bearing further comprising a second tubular layer of fibre reinforced polymer of a second type containing synthetic fibres of a second type wound around and along the rotation axis of the first tubular layer, wherein one of the first and second fibre reinforced polymers has greater compressive loading capability than the other and/or wherein the other of the first and second fibre reinforced polymers comprises dry lubricant particles.

13. A method of forming an aircraft landing gear assembly bearing, the method comprising:
   forming a first tubular layer of fibre reinforced polymer of a first type having an axis and containing synthetic fibres of a first type wound around and along a rotation axis of the first tubular layer;
   forming a second tubular layer of fibre reinforced polymer of a second type containing synthetic fibres of a second type wound around and along the outer surface of the first tubular layer; and
   curing the first and second layers to form a consolidated tubular body;
   wherein the one of the first and second fibre reinforced polymers has greater compressive strength characteristics than the other and/or wherein the other of the first and second fibre reinforced polymers contains dry lubricant particles.

14. The method according to claim 13, further comprising forming a radial flange on the bearing by machining away a portion of the second tubular layer to leave a radial flange.

15. The method according to claim 14, further comprising bonding a layer of self-lubricating material to an axial face of the flange.

16. The method according to claim 13, further comprising forming a radial flange and bonding the radial flange to an axial end face of the tubular body.

17. A method of forming or maintaining an aircraft landing gear assembly comprising a first structural member coupled to a second structural member via a mechanical coupling, the mechanical coupling comprising a bearing, the bearing defining a first bearing surface arranged to contact a first counter-face of the coupling, the method comprising:
   fitting a bearing to the coupling, the bearing defining a first bearing surface arranged to contact the first counter-face of the coupling, the first bearing surface being defined by a first tubular layer of fibre reinforced polymer of a first type having an axis and containing synthetic fibres of a first type wound around and along a rotation axis of the first tubular layer, the bearing further comprising a second tubular layer of fibre reinforced polymer of a second type containing synthetic fibres of a second type wound around and along the rotation axis of the first tubular layer, wherein the one of the first and second fibre reinforced polymers has greater compressive strength characteristics than the other and/or wherein the other of the first and second fibre reinforced polymers contains dry lubricant particles.

18. The method according to claim 17, whereby the method is a method of maintaining an aircraft landing gear, the method comprising a step of:
   removing a worn bearing from the mechanical coupling prior to the step of fitting the bearing to the coupling.

19. The aircraft landing gear of claim 1, wherein the rotation axis of the first tubular layer comprises a central axis of the first tubular layer.

* * * * *